United States Patent [19]
Aisaka et al.

[11] Patent Number: 5,048,117
[45] Date of Patent: Sep. 10, 1991

[54] RADIO TELEPHONE APPARATUS
[75] Inventors: Hideki Aisaka; Buntarou Sawa, both of Tokyo, Japan
[73] Assignee: Kabushiki Kaisha Toshiba, Japan
[21] Appl. No.: 316,913
[22] Filed: Feb. 28, 1989
[30] Foreign Application Priority Data
  Feb. 29, 1988 [JP] Japan .................................. 63-46062
[51] Int. Cl.$^5$ ............................. H04B 1/04; H04B 1/16
[52] U.S. Cl. .......................................... 455/89; 455/90; 455/127; 455/343
[58] Field of Search ................. 455/78, 79, 89, 90, 455/117, 127, 343, 200, 232
[56] References Cited
U.S. PATENT DOCUMENTS
4,511,761  4/1985  Yamazaki et al. ................ 455/127
4,636,741  1/1987  Mitelaff ............................... 455/89
4,726,052  2/1988  Kato et al. ......................... 455/127
4,852,147  7/1989  Suzuki et al. ..................... 455/343
4,893,348  1/1990  Andoh ................................. 455/89
4,920,557  4/1990  Umemoto ......................... 455/127

Primary Examiner—Curtis Kuntz

[57] ABSTRACT

A portable telephone apparatus which is capable of being selectively connected to an adaptor unit for transmitting a radio frequency (RF) signal at a certain power level in response to a level control signal. The telephone apparatus includes an amplifier for amplifying the RF signal by a predetermined amplification factor and an antenna for radiating the amplified RF signal. An operator actuatable switch is coupled to the output of the amplifier and is selectively coupled to the antenna and the adaptor unit. A control device is coupled to the amplifier and the operator actuatable switch and is responsive to the level control signal for controlling the amplifier so that the amplification factor of the amplifier is fixed to a predetermined level when the operator actuatable switch is in a first state and to a variable level when the actuatable switch is in a second state.

9 Claims, 8 Drawing Sheets

RADIO TELEPHONE APPARATUS

This application is related by subject matter to co-pending application Ser. No. 249,817 entitled RADIO TELEPHONE APPARATUS filed on Sept. 27, 1988 still pending.

1. Field of the Invention

This invention relates to the field of radio telephone apparatus for transmitting signals over a selected radio channel and, more particularly, to an improved radio telephone apparatus which includes a portable unit and an adaptor unit.

2. Background of the Invention

Mobile radio telephones are known as radio telephone apparatus and are used in vehicles such as automobiles. In an automobile telephone, a dial signal and a speech signal are input at a handset unit disposed near the seat of the automobile. These signals are transmitted from a transceiver unit, installed for example, in the trunk of the automobile, to a base station through which a communication link with a remote land line telephone or a remote radio telephone is established. In such a conventional automobile radio telephone apparatus, the handset unit near the automobile seat cannot be disconnected from the transceiver unit in the trunk. Thus, a user cannot use the apparatus outside the automobile.

The above-noted problems associated with prior art radio telephones are addressed by the radio telephone apparatus described and claimed in application Ser. No. 249,817 mentioned above. The radio telephone described therein can be used inside or outside an automobile. FIG. 1 is a perspective view of such a radio telephone apparatus. The radio telephone apparatus comprises a portable unit 101 with an antenna 102 and an adaptor unit 103. Portable unit 101 and adaptor unit 103 are connected to each other by a coaxial cable 104. Adaptor unit 103 is supplied with power from a car battery (not shown) through a power cable 106 and is connected to an antenna 105 which is disposed outside the automobile. In accordance with the construction of the radio telephone apparatus, both portable unit 101 and adaptor unit 103 are equipped with a radio transmit/receiver circuitry. Thus, a user may communicate with another person by using portable unit 101 also or by using portable unit 101 attached to adaptor unit 103.

FIG. 2 is a block diagram of the radio circuitry which Applicants have found may be used in the radio telephone apparatus shown in FIG. 1. In the event that only portable unit 101 is available to the user, the output of power amplifier (PA) 106 is connected via switch 111 to antenna 102 which is provided on portable unit 101. The control and speech signals generated by signal source 107 are thus amplified by PA 106 and then transmitted via antenna 102. The amplification factor of PA 106 is determined by automatic power control circuit (APC) 108. APC 108 determines the amplification factor in response to a level control signal received by level control signal receiver 112 from a base station (not shown) and a feedback signal provided from the output of PA 106. APC 108 provide a control signal which establishes the amplification factor of PA 106.

In the event that adapter unit 103 is available to the user along with portable unit 101, the output of PA 106 is connected to the input of power amplifier (PA) 109 via switch 111. Thus, signals generated by signal source 107 are amplified by PA 106 and PA 109 and then transmitted via antenna 105. In this configuration, APC 108 controls PA 106 in response to the level control signal and the feedback signal. Also, an automatic power control circuit (APC) 110 in adaptor unit 103 controls PA 109 in response to a level control signal received by level control signal receiver 114 from the base station (not shown) and a feedback signal provided from an output of PA 109.

Though the radio telephone apparatus illustrated in FIG. 2 represents a substantial improvement over such apparatus known in the prior art, it remains deficient in a number of respects. One such deficiency is that it is difficult to control the power level of the final amplifier stage, i.e., the output level of PA 109. This is because the input level to PA 109, i.e., the output level of PA 106, fluctuates in response to the control signal provided from APC 108.

SUMMARY OF THE INVENTION

It is accordingly an object of the present invention to provide an improved radio telephone apparatus including a portable unit and an adaptor unit in which transmission power level can be readily controlled.

It is a further object of the present invention to provide a portable unit capable of being attached to an adaptor unit wherein the output power level of the radio circuitry in the portable unit is stable.

In achieving these objects, as embodied and described herein, the invention includes a portable radio telephone apparatus capable of being selectively connected to an adaptor unit for transmitting a radio frequency signal at a certain power level responsive to a level control signal. The apparatus includes an amplifier for amplifying the radio frequency signal by a predetermined amplification factor and an antenna for radiating the amplified radio frequency signal. An operator actuatable switch is coupled to an output of the amplifier and is selectively coupled to the antenna and to an adaptor unit for applying the output signals of the amplifier to either the antenna or adaptor unit. A control device is coupled to the amplifier and the operator actuatable switch and is responsive to the level control signal for controlling the amplifier so that the amplification factor of the amplifier is fixed to a predetermined level when the operator actuatable switch is in a first state. The amplification factor of the amplifier is variable in response to the level control signal when the operator actuatable switch is in a second state.

The problems and deficiencies of other radio telephone apparatus discussed above are solved by the principles of the present invention. In this invention, responsive to an actuation of the operator actuatable switch, an amplification factor to be provided to the amplifier in the portable unit is fixed at a predetermined value. Accordingly, the output power level of the amplifier becomes stable without fluctuating in response to a level control signal or a feedback signal. Therefore, in the event that the portable unit is connected to the adaptor unit, the output power level of the adaptor unit can be accurately controlled in response to the level control signal.

DETAILED DESCRIPTION OF THE PREFERRED EMBODIMENT

A preferred embodiment of the present invention will be described with reference to the accompanying drawings.

Figure 1:
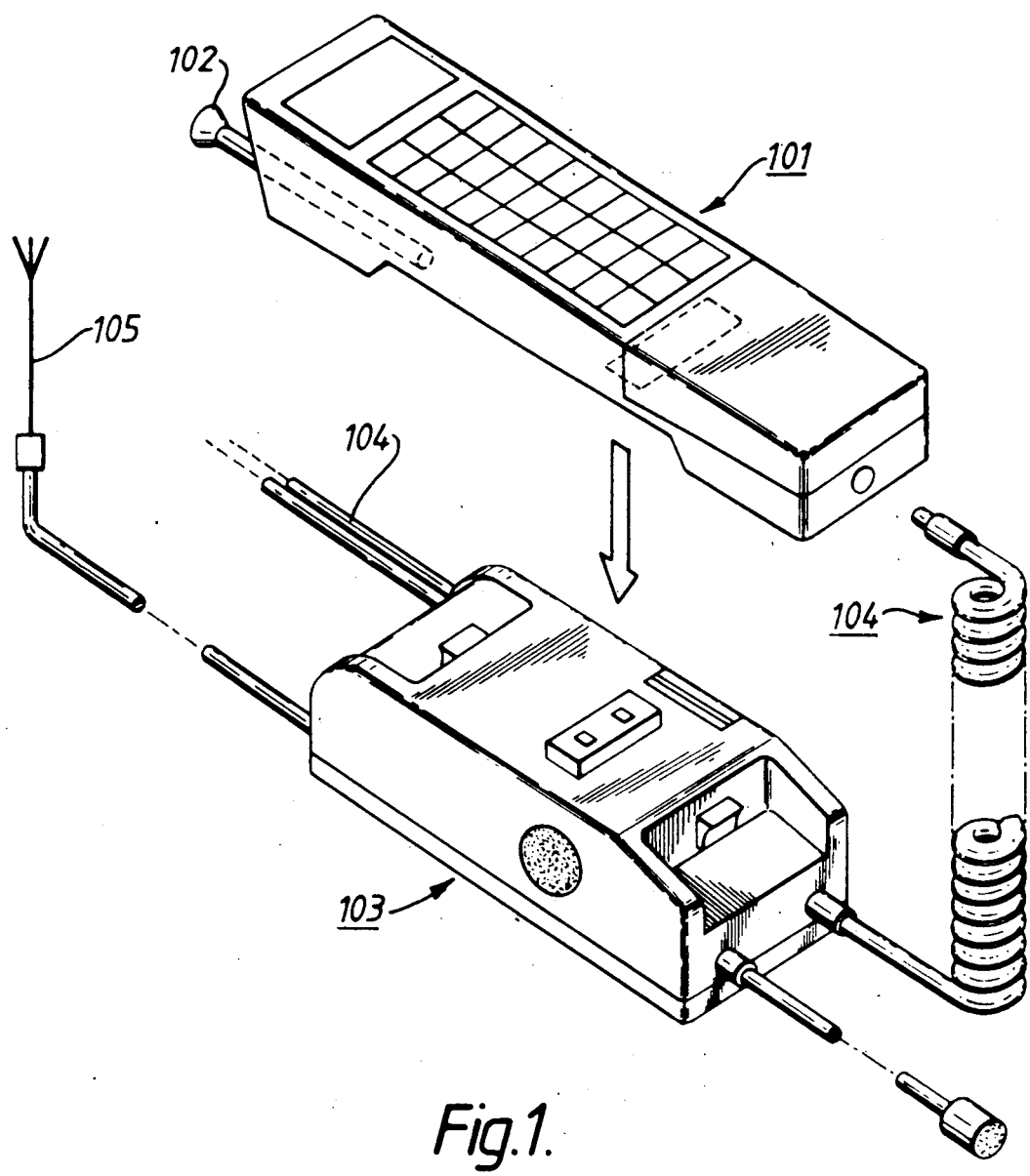
FIG. 1 is a perspective view of a copending radio telephone.
Figure 2:
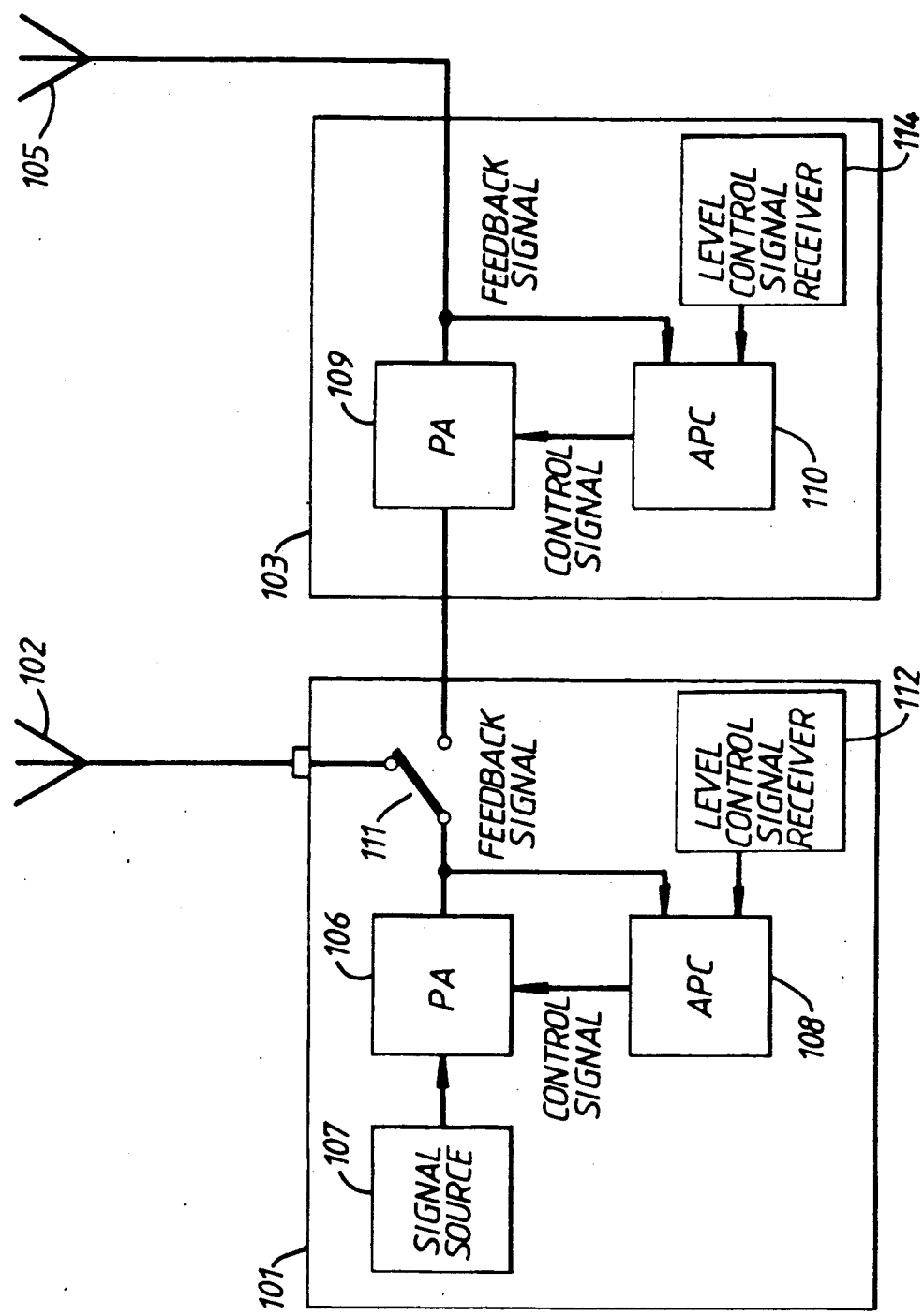
FIG. 2 is a block diagram of the radio circuitry used in the copending radio telephone apparatus shown in FIG. 1.
Figure 3:
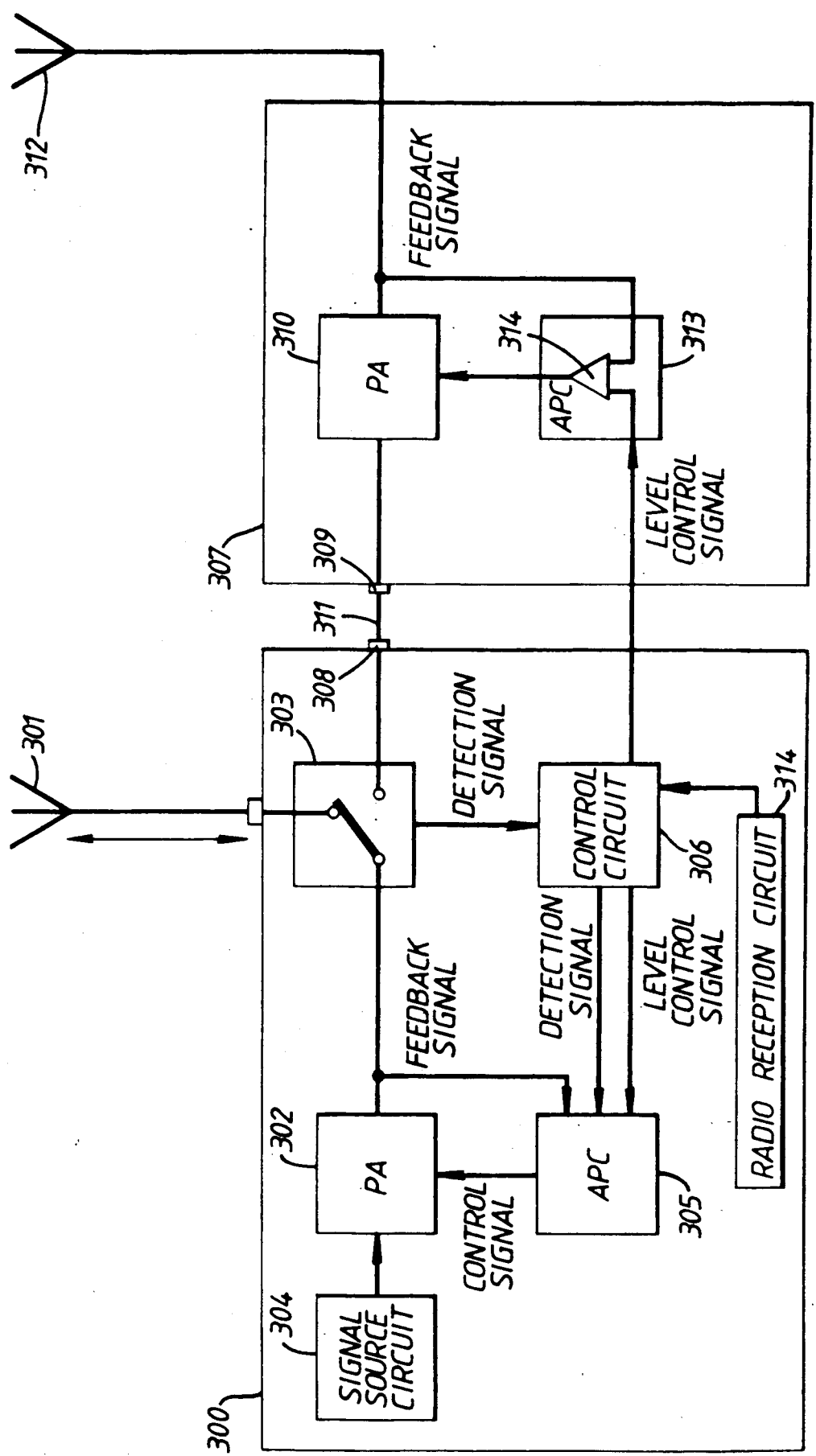
FIG. 3 is a schematic block diagram of a radio transmission circuit used in a radio telephone apparatus in accordance with an embodiment of the present invention.

FIG. 3 is a block diagram of a radio transmission circuit used in a radio telephone apparatus according to one embodiment of the present invention. In FIG. 3, an antenna 301 is capable of being extended to increase its length for use or collapsed for storage when not in use. Such an antenna may be selected from among those known in the art as telescoping antennas. When antenna 301 is extended, the output of a power amplifier (PA) 302 is connected to antenna 301 by a switching circuit 303. Control and speech signals to be transmitted are provided from signal source circuit 304 in the form of radio frequency (RF) signals and are radiated from antenna 301 after being amplified by PA 302. A portion of the output signal from PA 302 is coupled to an automatic power control circuit (APC) 305 as a feed back signal. Also, switching circuit 303 sends a detection signal (an on state signal) indicative of the extension of antenna 301 to APC 305 via a control circuit 306. Responsive to the detection signal, APC 305 controls PA 302 so that the amplification factor of PA 302 is variable in response to a level control signal. PA 302 changes it's amplification factor in response to the level of the control signal provided from APC 305. The level control signal is transmitted from a base station and is received by a radio reception circuit 314 and is provided to APC 305 via control circuit 306.

Figure 4:
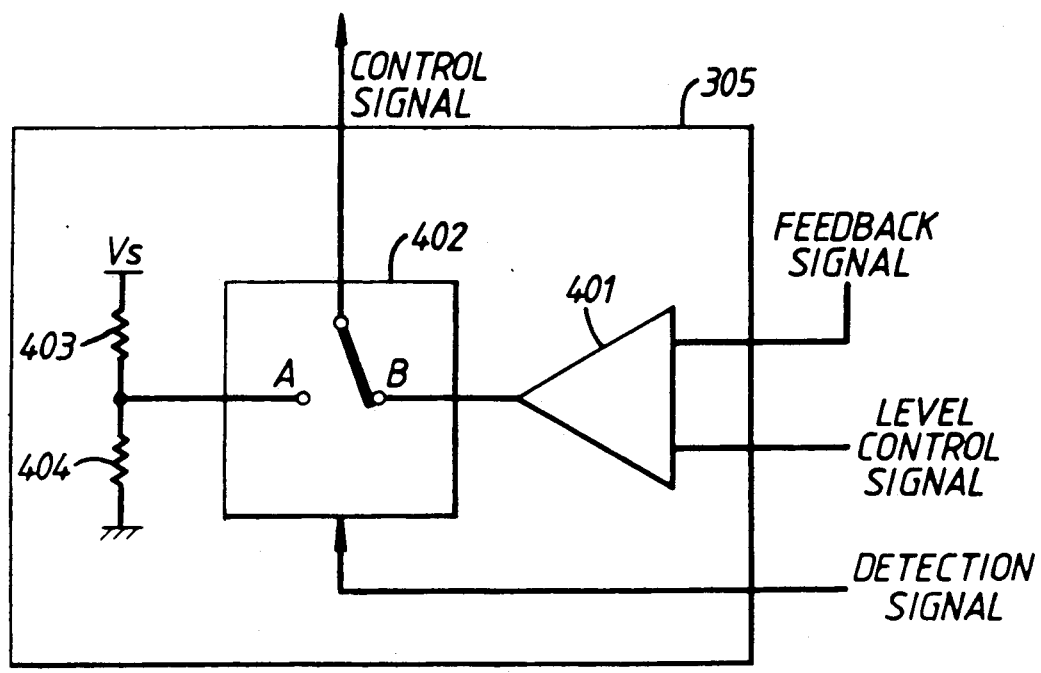
FIG. 4 is a schematic diagram of automatic power control circuit 305 shown in FIG. 3.

FIG. 4 is a schematic diagram of APC 305. The level control signal is compared to the feedback signal by a comparator circuit 401. When antenna 301 is extended, switching circuit 402 switches to the B position so that the output of comparator circuit 401 is applied to PA 302 as the control signal.

Thus, by extending antenna 301, portable unit 300 is able to transmit an RF signal without the adaptor unit which has a magnitude responsive to the level control signal. It should be noted that the switching operation in switching circuit 303 (FIG. 3) and switching circuit 402 (FIG. 4) depends on the extension of antenna 301 provided at portable unit 300, not on the connection between portable unit 300 and adaptor unit 307. Therefore, it is not necessary in this invention to detect a connection between portable unit 300 and adaptor unit 307. Thus, circuitry for detecting the connected relationship is not needed.

Referring to FIG. 3 again, when antenna 301 is collapsed, the output of PA 302 is coupled to an output terminal 308. Output terminal 308 is coupled to an input terminal 309 which is connected to power amplifier (PA) 310 of adaptor unit 307 through coaxial cable 311. Accordingly, the output signals from PA 302 are applied to the input of PA 310. The applied signals are radiated from antenna 312 after being amplified by PA 310. A portion of the output signal from PA 310 is supplied to an automatic power control circuit (APC) 313 as a feedback signal. Also, switching circuit 303 sends a detection signal (an off state signal) indicative of the collapsed state of antenna 301 to APC 305 via control circuit 306. Responsive to the detection signal, APC 305 controls PA 302 so that the amplification factor of PA 302 is fixed to a predetermined level.

Referring to FIG. 4 again, responsive to the detecting signal (an off state signal), switching circuit 402 changes to the a position so that a predetermined voltage level, which is provided from a power supply voltage Vs divided by resistors 403 and 404, is applied to PA 302. The amplification factor of PA 302 is thus fixed to a predetermined level. The level is set at a predetermined level so that PA 310 in adaptor unit 7 is appropriately driven.

The level control signal provided from control circuit 306 also is applied to APC 313. In APC 313, the level control signal is compared with the feed back signal from the output of PA 310 by a comparator circuit 314. An output of comparator circuit 314 is applied to PA 310.

Thus, by collapsing antenna 301, an RF signal is amplified at a predetermined amplification level in portable unit 300. The amplified RF signal is coupled to adaptor unit 307 and further amplified by an amplification factor responsive to the level control signal in adaptor unit 307.

Figure 5:
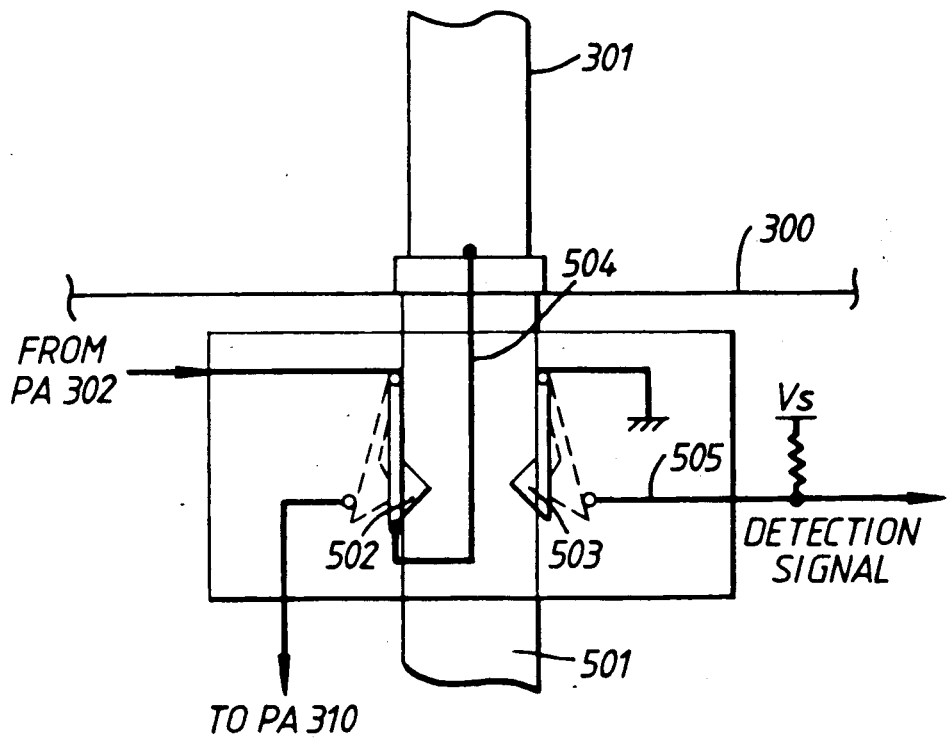
FIG. 5 is a structural diagram of switching circuit 303 shown in FIG. 3.

FIG. 5 is a structural diagram of switching circuit 303 shown in FIG. 3. A hole 501 is provided in portable unit 300 to accommodate antenna 301. At a side wall of hole 501, two switch elements 502 and 503 are provided so as to be pushed aside when antenna 301 is accommodated in hole 501. One end of switch element 502 is connected to the output of PA 302. A line 504 is connected from antenna 301 on one end of switch element 502 when antenna 301 is extended. When antenna 301 is accommodated in hole 501, switch element 502 is pushed aside and then the other end of switch element 502 is connected to the input of PA 310. Switch element 503 is used for generating the detection signal indicative of the state of antenna 301.

If antenna 301 is extended, the detection signal is maintained at a high logic level since signal line 505 is pulled to a high voltage level by power supply voltage Vs since it is not in contact with switch element 503. If antenna 301 is accommodated in hole 501, the detection signal is maintained at a low level since signal line 505 contacts one end of switch element 503 and the other end of switch element 503 is connected to ground.

Figure 6:
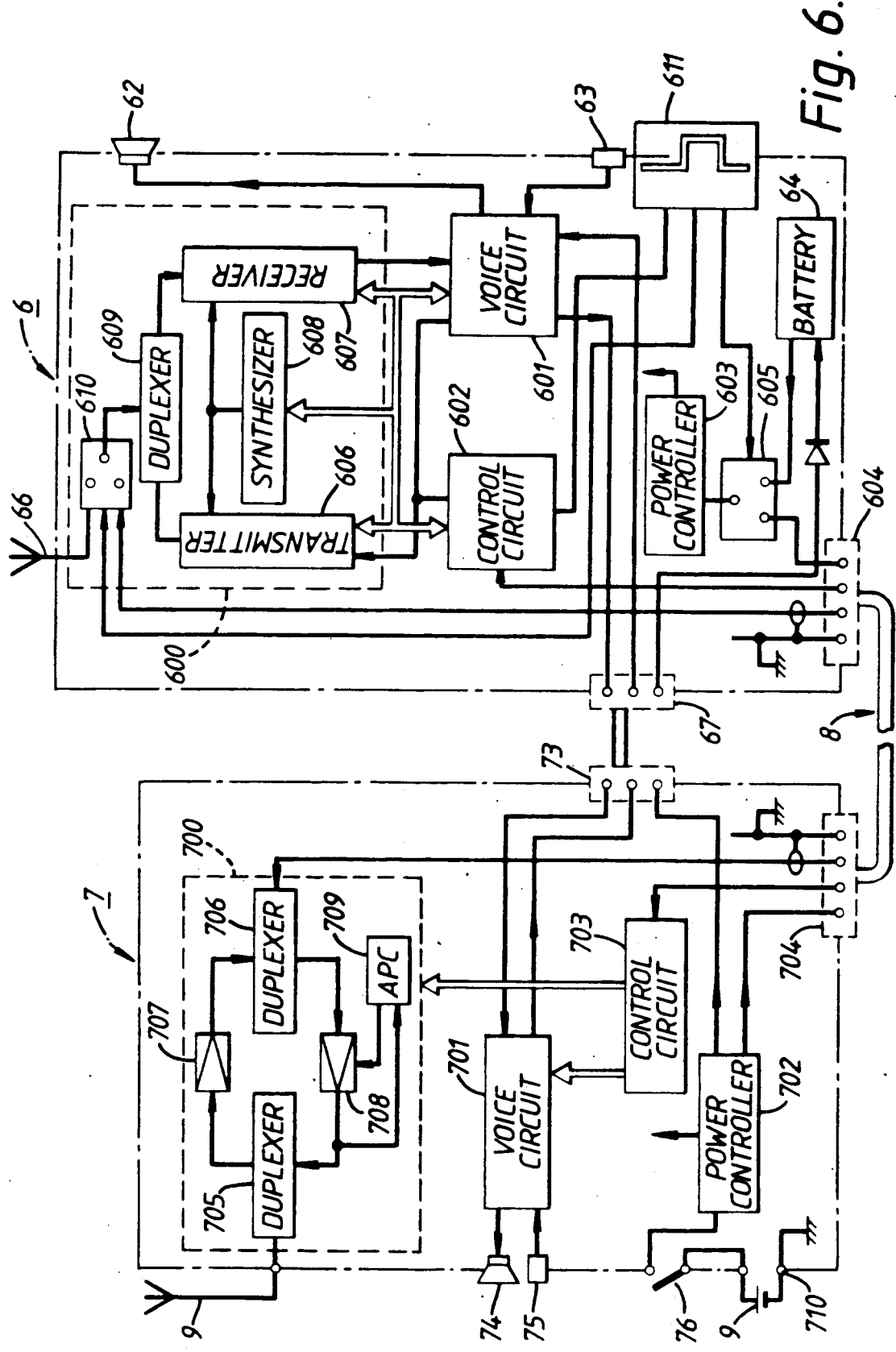
FIG. 6 is a block diagram of a mobile telephone in accordance with another embodiment of the present invention.

Another embodiment of the present invention relating to a mobile telephone includes a portable unit and an adaptor unit will be described. FIG. 6 is a block diagram showing the arrangement of the mobile telephone according to this embodiment.

A portable unit 6 comprises an antenna 66, a duplexer 609, a receiver 607, a transmitter 606, a synthesizer 608, a voice circuit 601, a control circuit 602, a power controller 603, a battery 64, a speaker 62, a microphone 63, switch circuits 605, 610, and 611, a connection terminal 67 and a cable connector 604.

An adaptor unit 7 comprises a booster unit 700, a voice circuit 701, a power controller 702, a control circuit 703, an antenna 9, a loudspeaker 74, a microphone 75, a power switch 76, a connection terminal 73, a cable connector 704, and a battery connector 710. Booster unit 700 comprises duplexers 705 and 706, a reception amplifier 707, a transmission power amplifier 708, and an automatic power control circuit (APC) 709. A car battery 9 is connected to battery connector 710.

Portable unit 6 is connected to adaptor unit 7 via a coaxial cable 8 connected to cable connectors 604 and 704. Also, portable unit 6 is directly connected to adaptor unit 7 through connection terminals 67 and 73.

Figure 7A:
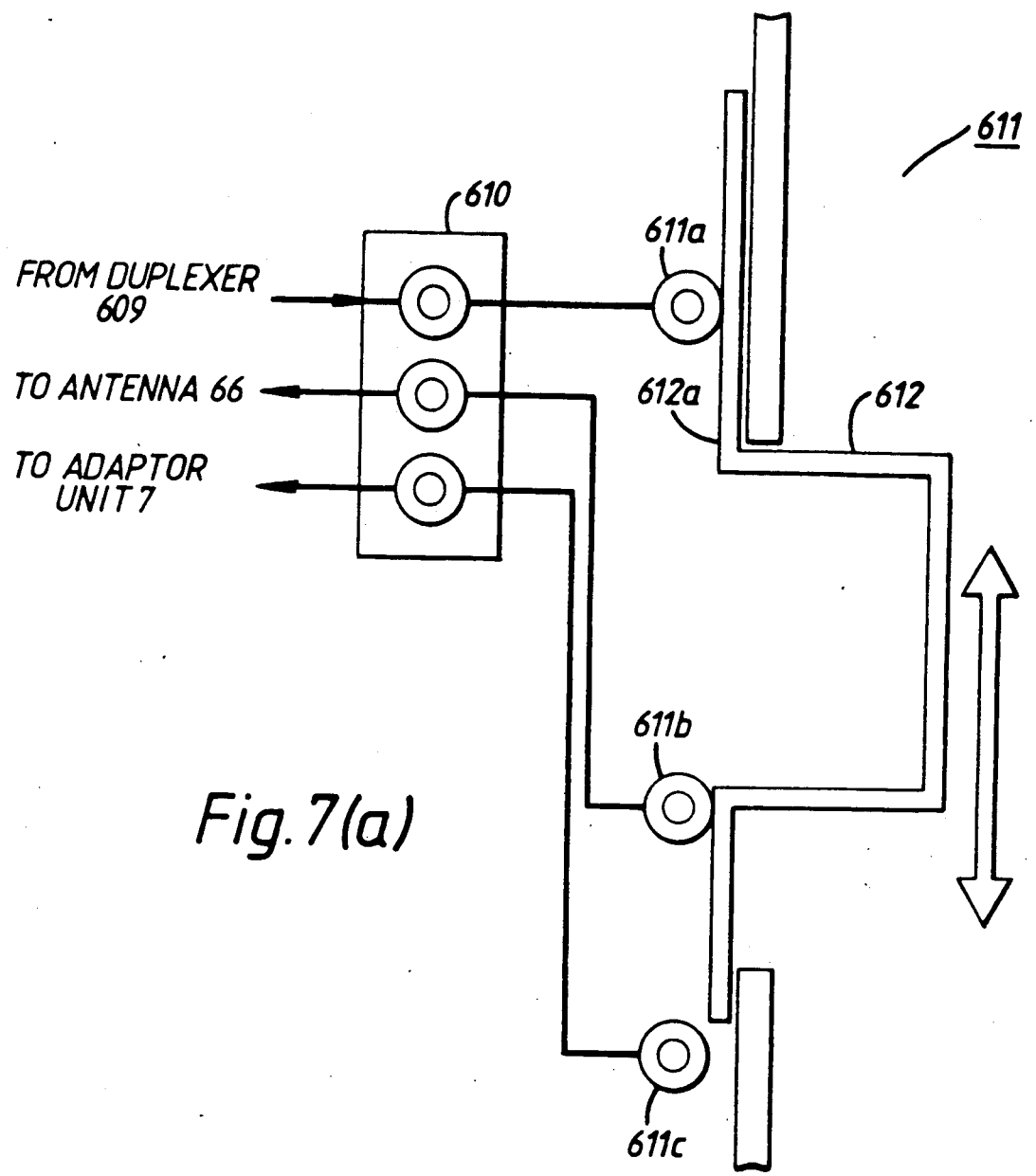
FIGS. 7(a) and (b) are structural diagrams of switch circuit 611 shown in FIG. 6.
Figure 7B:
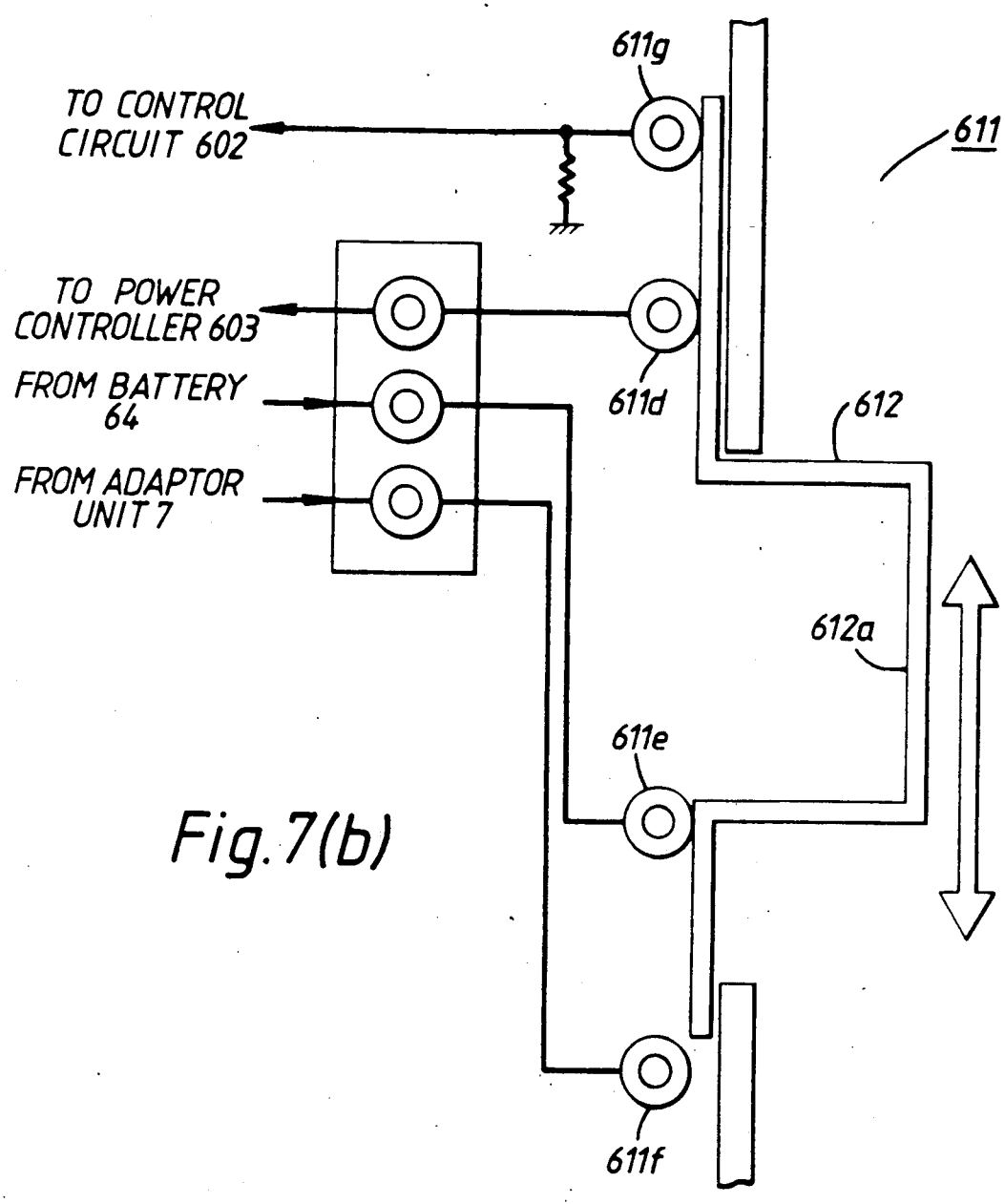

FIG. 7(a) and FIG. 7(b) are structural diagrams of switch circuit 611 in portable unit 6. Referring to FIG. 7(a), a strip line is provided at an inside surface 612a of switch 612. A terminal 611a is connected to duplexer 609. A terminal 611b is connected to antenna 6b. A terminal 611c is connected to adaptor unit 7 through coaxial cable 8. If switch 612 is moved to the high position in FIG. 7(a), terminal 611a is connected to terminal 611b through the strip line. Accordingly, duplexer 609 is coupled to antenna 66. If switch 612 is moved to the low position in FIG. 7(a), terminal 611a is connected to terminal 611c through the strip line. Accordingly, duplexer 609 is coupled to duplexer 706 in adaptor unit 7 through coaxial cable 8. The transmission line between antenna 66 and duplexer 609, or between duplexer 706 and duplexer 609, is formed of a strip line and a metalic line for transmitting RF signals.

Likewise, referring to FIG. 7(b), a lead line is provided at an inside surface 612a of switch 612. A terminal 611d is connected to power controller 603. A terminal 611e is connected from battery 64. A terminal 611f is connected from adaptor unit 7 through coaxial cable 8. If switch 612 is moved to the high position in FIG. 7(b), terminal 611d is connected to terminal 611e through the lead line. Accordingly, power controller 603 is connected to battery 64. If switch 612 is moved to the low position in FIG. 7(b), terminal 611d is connected to terminal 611f through the lead line. Accordingly, power controller 603 is connected to power controller 702 in adaptor unit 7 through coaxial cable 8. Also, terminal 611g is provided at the end of switch 612. Terminal 611g is connected from control circuit 602 as an input for the detection signal. Since power controller 603 is supplied power from battery 74, or power controller 702 in adaptor unit 7, the voltage level of the lead line of switch 612 is in an on state. Therefore, if switch 612 is moved to the high position in FIG. 7(b), the voltage of switch 612 is applied to terminal 611g and the input to control circuit 602 becomes on state. Conversely, if switches 612 is moved to the low position, the input to control circuit 602 becomes an off state.

Figure 8:
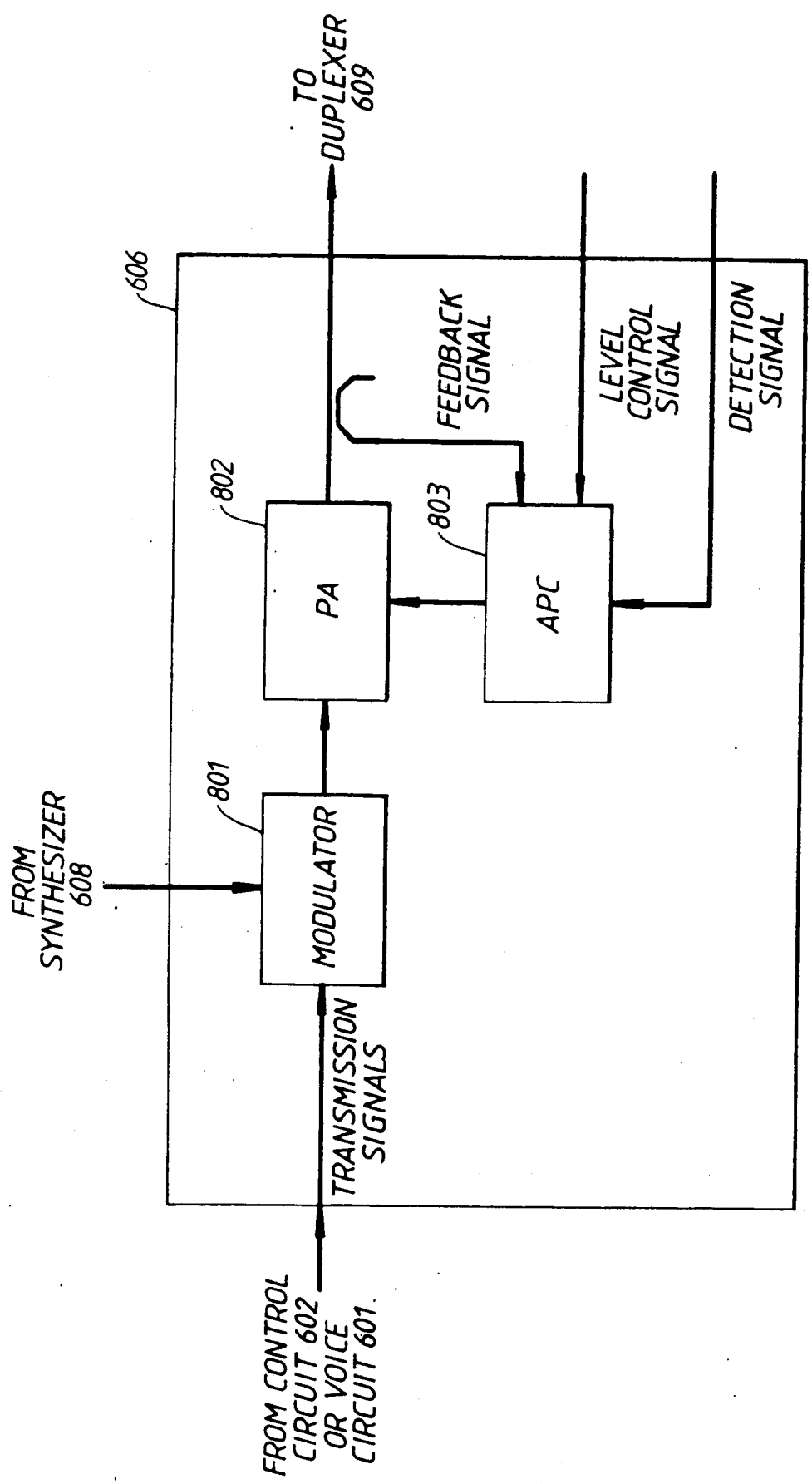
FIG. 8 is a block diagram of transmitter 606 shown in FIG. 6.

FIG. 8 is a block diagram of transmitter 606 shown in FIG. 6. Control signals from control circuit 602, or speech signals from voice circuit 601, are applied to a modulator 801. Modulator 801 modulates the applied signals on the basis of a modulation frequency signal provided from synthesizer 608. The modulated signals are applied to power amplifier (PA) 802. PA 802 amplifies the applied signals at an amplification factor provided from an automatic power control circuit (APC) 803. APC 803 has the same arrangement of APC 305 shown in FIG. 4. APC 803 provides an amplification factor to PA 802 in response to a feedback signal, a level control signal, and the detection signal from switch circuit 611. The amplified signals are applied to duplexer 609.

When switch 612 is moved to the high position in FIG. 7(a) and FIG. 7(b), power controller 603 is supplied power from battery 64 and duplexer 609 is coupled to antenna 66. Also, control circuit 602 receives the detection signal (an on state signal) from switch 611. Responsive to the detection signal, control circuit 602 sends a control signal to switch circuit 402 (FIG. 4) of APC 803 so that the output of comparator 401 (FIG. 4) is applied to PA 802 as an amplification factor. Accordingly, each section of portable unit 6 is supplied power from battery 64 via power controller 603. When the transmission signals provided from control circuit 602, or voice circuit 601, are applied to transmitter 606, these signals are amplified by PA 802 of transmitter 606 at an amplification factor responsive to the level control signal and the feedback signal. The amplified signals are applied to duplexer 609 and radiated from antenna 66.

When switch 612 remains in the low position in FIG. 7(a) and FIG. 7(b), if power switch 76 of adaptor unit 7 is closed, power controller 603 is supplied power from the car battery via power controller 702 through coaxial cable 8. Duplexer 609 is coupled to duplexer 706 through coaxial cable 8. Also, control circuit 602 receives the detection signal (an off state signal) from switch circuit 611. Responsive to the detection signal, control circuit 602 sends a control signal to switch circuit 402 (FIG. 4) of APC 803 so that a fixed voltage divided by resistors 403 and 404 is applied to PA 802 as an amplification factor. Also, control circuit 602 provides a level control signal to APC 709 in adaptor unit 7 through coaxial cable 8. Accordingly, each section of both portable unit 6 and adaptor unit 7 is supplied power from car battery 9 via power controller 603 and 702. When the transmission signals provided from control circuit 602, or voice circuit 601, are applied to transmitter 606, these signals are amplified in PA 802 of transmitter 606 at an amplification factor responsive to the fixed voltage.

The amplified signals are coupled to duplexer 706 via coaxial cable 8 and applied to PA 708. APC 709 compares the level control signal with a feedback signal from the output of PA 708 and provides an output signal from the comparison to PA 708 as an amplification factor. So, the signals applied to PA 708 is amplified at an amplification factor responsive to the level control signal and the feedback signal. The signals amplified by PA 708 are applied to duplexer 609 and radiated from antenna 66.

It should be obvious from the above-discussed apparatus embodiment that numerous other variations and modifications of the apparatus of this invention are possible, and such will readily occur to those skilled in the art. Accordingly, the scope of this invention is not to be limited to the embodiment disclosed, but is to include any such embodiments as may be encompassed within the scope of the claims appended hereto.

We claim:

1. A portable radio telephone apparatus capable of being selectively connected to an adaptor unit for transmitting a radio frequency signals at a certain power level responsive to a level control signal, said radio telephone apparatus comprising:

amplifying means for amplifying said radio frequency signal by an amplification factor;

radiating means for radiating said amplified radio frequency signal;

an operator actuatable switch coupled to an output of said amplifying means and selectively coupled to said radiating means and said adaptor unit for selectively applying the output signals of said amplifying means to either of said radiating means or said adaptor unit;

control means coupled to said amplifying means and to said operator actuatable switch and responsive to said level control signal for controlling said amplifying means so that said amplification factor of said amplifying means is fixed to a predetermined level when said operator actuatable switch means is in a first state and so that said amplification factor of said amplifying means is variable in response to said level control signal when said operator actuatable switch is in a second state, wherein said radiating means comprises an antenna capable of being extended and said operator actuatable switch is activated in cooperation with the extension of said antenna.

2. The apparatus of claim 1 further comprising power supply means for supplying power to each section of said apparatus when said operator actuatable switch is actuated.

3. The apparatus of claim 2 wherein said power supply supplies power to said adaptor unit when said operator actuatable switch is not actuated.

4. A radio telephone apparatus for transmitting signals having a predetermined level in response to a level control signal comprising a portable unit and an adaptor unit capable of being attached to said portable unit; wherein said portable unit including:

signal source means for generating signals to be transmitted;

first amplifying means coupled to said signal source means for amplifying said signals generated by said signal source means at an amplification factor;

first radiating means for radiating applied signals;

switch means, coupled to said first amplifying means and selectively coupled to either of said first radiating means or an output terminal for selectively applying the output signals from said first amplifying means to either of said first radiating means or said output terminal, wherein said first radiating means comprises an antenna capable of being extended and said switch means is activated in cooperation with the extension of said antenna;

control means coupled to said first amplifying means and said switch means for controlling the amplification factor of said first amplifying means in response to the actuation of said switch means and said level control signal;

said adaptor unit including:

an input terminal capable of being connected to said output terminal of said portable unit;

second amplifying means coupled to said input terminal for amplifying signals applied from said input terminal at an amplification factor;

second radiating means coupled to said second amplifying means for radiating an output signal of said second amplifying means.

5. The apparatus of claim 4 wherein said control means controls said first amplifying means so that the amplification factor of said first amplifying means is fixed to a predetermined level when said switch means is not actuated.

6. The apparatus of claim 5 wherein said control means further controls second amplifying means so that the amplification factor of said second amplifying means is changeable in response to said level control means.

7. The apparatus of claim 4 wherein said control means controls said first amplifying means so that the amplification factor of said first amplifying means is changeable in response to said level control signal when said switch means is actuated.

8. The apparatus of claim 4 wherein said portable unit comprises first power supply means for supplying power to each section of said portable unit when said switch means is actuated.

9. The apparatus of claim 8 wherein said adaptor unit comprises second power supply means for supplying power to each section of said portable unit and said adaptor unit when said switch means is not actuated.

* * * * *